Oct. 8, 1929.  J. J. TATUM  1,730,635

FRICTION DRAFT GEAR

Filed June 2, 1926

Inventor
John J. Tatum
By Edwin S. Clarkson
Attorney

Patented Oct. 8, 1929

1,730,635

UNITED STATES PATENT OFFICE

JOHN J. TATUM, OF BALTIMORE, MARYLAND

FRICTION DRAFT GEAR

Application filed June 2, 1926. Serial No. 113,162.

My invention relates to friction shock absorbing mechanism used particularly as friction draft gears for railway vehicles, and comprises a gear composed of springs and friction elements arranged to resist extremely heavy stresses generally imposed by modern service conditions on steam and electric railroads. It is constructed so as to insure a cushioning resistance capacity for the drawbars of cars in such a way to relieve the attachments, and the part of the vehicle to which they are anchored, from being damaged by heavy impacts and drafts inflicted by modern steam and electric motive power.

This shock absorber is so arranged as to place under compression springs and a hollow post or column when friction is being produced against the outer walls of such hollow post or column, due to a wedge shaped metal form or shoes surrounding its outer walls, and being forced against the outer walls by a hooded follower with bearing surfaces on the face of its inner wall suitable to the angle of the metal friction shoe or form. The hooded follower is brought to a prompt release position by the release spring placed within the walls of the hollow column or friction post on which it rides, insuring prompt freedom of the metal friction forms or shoes, resulting in full and prompt release of the shock absorber from a compressed position to a released position.

Figure 1:
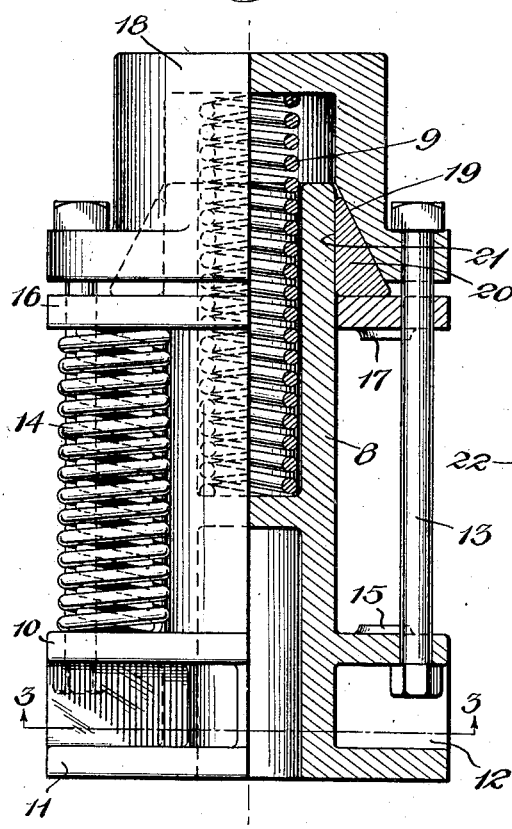
Figure 1 is a top plan view of my draft gear, parts being in section.
Figure 3:
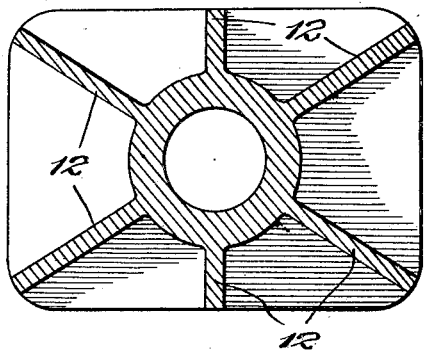
Figure 3 is a sectional view on the line 3—3, Figure 1.

The reference numeral 8 designates a hollow column, preferably of cylindrical shape, which provides frictional surface on its outer wall, there being a release spring (or springs) 9 seated within the column, one end of the spring 9 projecting beyond the outer end of the column, as clearly shown in Figure 1. At the rear end of the column 8 I provide radial flanges 10 and 11 between which extend integral webs 12, the flange 10 being provided with bolt openings adapted to receive the gear assembling bolts 13; the base or flange 11 being designed to rest against opposing stops provided on the car; the flange 10 provides a floor on which rests the load springs 14, the lower ends of the springs being seated over the lugs 15 on said floor.

The follower 16 is slidably mounted on the assembly bolts 13 and is provided with seats 17 around which the other end of the load springs 14 are seated, as clearly shown.

18 is a hooded friction follower, also slidably mounted on the assembly bolts 14, the interior diameter of the hood being cylindrical for a portion of its length and conical the remaining portion of its length, as shown in Figure 1, the conical face 19 being a friction surface. The outer end of the spring 9 is seated within the cylindrical portion of the hood and the outer end of the post or column 8 is adapted to slide within said cylindrical portion of the hood, whereby the hooded friction follower 18 is released from a compressed position by the preliminary action of the release spring 9.

Figures 2, 5:
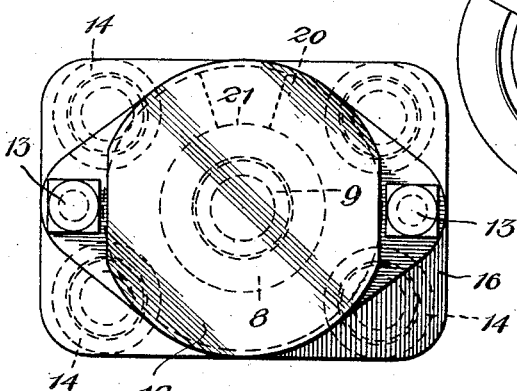
Figure 2 is a top plan view of Figure 1.
Figures 4, 5, 6, are top plan views of different types of friction rings.
Figure 4:
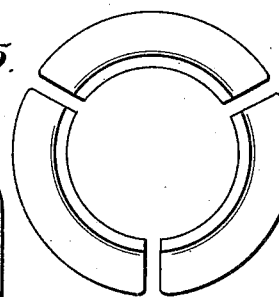
Figure 6:
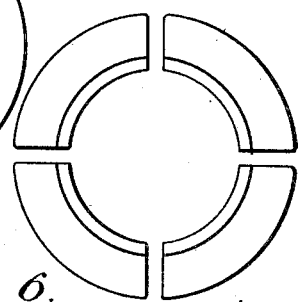

20 is a friction form or wedge surrounding the outer wall of a hollow column 8 and is wedged hard against the outer face of the column to produce friction resistance, by the use of hooded follower 18. The friction form 20 is made ring-shape with two free ends—the space between the free ends to provide for closing in tight against the column post 8. It may be also made in more than one piece as shown in Figures 5 and 6, as the column 8 may be made in other various shapes and hollow in place of round or cylindrical in form, therefore, the friction form 20 must be made to conform with the shape of the column 8 and in as many pieces as necessary to insure free and proper movement for friction.

16 is the friction wedge floating support through which is transmitted the load on the spring or springs 14. The springs 14 may be reduced to one, surrounding the hollow column or post 8, or there may be two or more placed outside of the hollow post or column.

The release spring 9 provides load capacity when under compression and insures prompt return of the gear to release position immediately the load is lightened. This spring is of much importance, because of the important work it does, as it helps in providing cushioning capacity and insures instantaneous and full release of the cushioning device and all its elements when the load is relieved.

The gear assembling bolts 13 provide for the gear being held in a united position when free from its harness by which it is attached to the drawbar. These bolts also provide the harnessing of a preliminary load on the springs and friction elements within the gear, placing the gear in position to resist light loads thrust against it without its working load elements being put into action.

21 represents the friction surface of the friction form or shoes.

Figure 7:
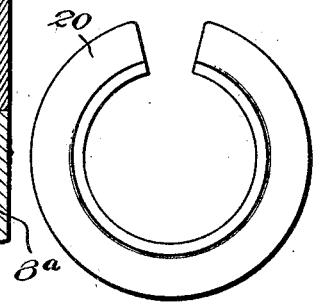
Figure 7 is a longitudinal sectional view of a modified column.

In Figure 7 I have shown the post or column 8ª provided with a friction wearing sleeve 22. This sleeve is forced on the column under pressure to hold it to place, and as it wears to an unserviceable thickness by friction form or ring 20, it can be removed and another sleeve substituted, thereby restoring the column 8 to full dimensions.

It will be noted that this draft gear is arranged so that the friction surface of the column 8 is always under compression, which lessens the liability of its breaking or bursting, as compared with those built under tension where the friction surfaces are inside the column. By positioning the friction surface on the outer face of the column I get a larger friction surface for the friction wedge ring 20, thereby providing high capacity, and without increasing the diameter of the column.

What I claim is:

1. In a cushioning means for a draft gear, a hollow column having an outer friction surface, a radial flange at the base of said column and a second radial flange on the column spaced from the first named flange, assembly bolts anchored to said second named flange and slidable therethrough, a follower slidably mounted on said column and bolts, load sustaining springs supporting said follower, a hooded follower slidably mounted on said assembly bolts, a coiled spring one end of which is seated within the hollow column while its other end is seated within the hooded follower, and wedging means between the hooded follower and the outer face of the column.

2. In a cushioning means for draft gear, a hollow column having an outer friction face, a radial flange on the column and above the base of said column, assembly bolts slidably secured in said flange, a follower slidably mounted on said column and bolts, load sustaining springs positioned between said follower and said flange, a hooded follower slidably mounted on said assembly bolts, the face of the inner wall of said hooded follower being flared to provide a friction surface, wedging means between the hooded follower and the outer face of the column and normally resting on the first named follower, and a spring, one end of which is seated in the hollow column while its other end is seated within the hooded follower and normally supports the hooded follower out of wedged position.

In testimony whereof I affix my signature.
JOHN J. TATUM.